United States Patent [19]

Howell et al.

[11] 4,088,945
[45] May 9, 1978

[54] LOGGING PROBE FOR MAKING REDOX POTENTIAL MEASUREMENTS

[75] Inventors: Eddie P. Howell; Orland J. Gant, Jr., both of Plano; Daniel P. Hearn, Richardson; Robert D. Coffee, Dallas, all of Tex.

[73] Assignee: Atlantic Richfield Company, Los Angeles, Calif.

[21] Appl. No.: 753,759

[22] Filed: Dec. 23, 1976

[51] Int. Cl.² .............................................. G01V 3/18
[52] U.S. Cl. ...................................... 324/10; 324/11
[58] Field of Search ................ 324/1, 2, 10, 11, 30 R, 324/30 B, 65 P; 73/152, 153

[56] References Cited

U.S. PATENT DOCUMENTS

| | | | |
|---|---|---|---|
| 2,233,420 | 3/1941 | Leonardon | 324/10 X |
| 2,400,678 | 5/1946 | Archie | 324/10 X |
| 2,526,636 | 10/1950 | Colman | 324/65 P |
| 2,669,689 | 2/1954 | Doll | 324/10 X |
| 2,747,402 | 5/1956 | Doll | 324/10 X |
| 2,833,982 | 5/1958 | Maly | 324/10 X |
| 2,894,200 | 7/1959 | Szasz | 324/10 |
| 3,302,102 | 1/1967 | Lace | 324/65 P |
| 3,538,425 | 11/1970 | Veneziani | 324/10 X |
| 3,735,249 | 5/1973 | Stoll | 324/9 |
| 3,968,428 | 7/1976 | Numoto | 324/65 P |

Primary Examiner—Gerard R. Strecker
Attorney, Agent, or Firm—Robert M. Betz

[57] ABSTRACT

Method and apparatus for electrical logging in a mud-filled borehole by sensing redox potential and other formation characteristics. An elongated, tubular probe body contains reference and potential measuring electrodes which extend longitudinally thereof and are adapted to make external contact with the borehole fluid at the streamlined surface of the probe nose. The metal reference electrode member is immersed in an electrolyte-filled compartment separated from the external borehole fluid by a pressure-compensating diaphragm in the probe side wall, a fluid bridge with the mud of the borehole being established through a permeable ceramic wick. Probe design insures adequate mud flow past the electrodes in a nonturbulent state as the probe is lowered, thus eliminating clogging and providing good electrical contact. Alternate means are provided for maintaining a positive leak pressure regardless of borehole conditions.

7 Claims, 7 Drawing Figures

LOGGING PROBE FOR MAKING REDOX POTENTIAL MEASUREMENTS

BACKGROUND OF THE INVENTION

1. Field of the Invention

This invention relates generally to the field of electrical logging and more particularly to the measurement of oxidation-reduction ("redox") potential and hydrogen ion concentration in mud-filled boreholes as an aid in the detection of the presence and contour of subsurface mineral deposits.

2. Description of the Prior Art

In practicing the so-called "redox" logging technique in accordance with the prior art, an inert electrode such as platinum or gold (the "redox" electrode) is immersed in the mud of a shallow wellbore by means of a moving probe. The function of the redox electrode is to "pick up" the potential corresponding to the oxidation-reduction e.m.f.'s existing in the surrounding mud. Measurement is taken with respect to a reference electrode such as a saturated calomel electrode. This potential has been characterized as an absolute and reproducible measure of the response of sediments to spontaneous electron transfer as may take place between an oxidized environment and a reduced environment. Consequently, it is of great importance in mapping of geochemical cells or so-called "roll fronts" associated with uranium and other mineral deposits. Mineral ore occurs along the oxidation-reduction boundary of the cell.

Redox logging has been carried out in accordance with the teachings of several United States patents, for example, U.S. Pat. Nos. 2,691,757 and 3,098,198 to Salimbeni; U.S. Pat. Nos. 3,182,735 to Salimbeni et al; and 3,538,425 to Veneziani. In the last named patent, Veneziani teaches a multi-electrode logging probe inserted in a mud-filled borehole containing at least one redox electrode and one reference electrode individually connected to separate conductors of a probe-running cable.

One problem in such prior art probes lies in the fact that the exposed redox electrodes tend to become clogged by a film of mud as the probe is moved, in which case the Eh measurement is only that of the original mud layer adhering to the tool. This tends to make the speed of redox logging critical. If the speed becomes too great, equilibrium conditions are not reached and again an inaccurate measurement results. A proposed solution has been to maintain a constant logging speed throughout the logging process, but clearly it would be preferable to avoid any limitation of this nature. (See in this connection a published paper entitled *The Redox Log,* SPWLA, 13th Annual Logging Symposium, May 7-10, 1972.)

In redox logging probes, the prior art preferentially employs a silver-silver chloride metal reference electrode member saturated in an electrolyte such as potassium chloride. In order to establish a fluid bridge, the electrolyte contacts the mud of the borehole through a permeable wick, membrane or other barrier. Pressure compensation means must be provided so that the pressure of the electrolyte increases with the external ambient hydrostatic pressure. If the electrolyte is at least as heavy as the mud, this insures constant electrical contact with the borehole mud through the fluid barrier and prevents contamination of the electrolyte. If, however, under severe mud conditions, a significant positive leak is desired from the electrolyte into the mud at all times, then means must be provided to insure a corresponding positive differential between the electrolyte and the external borehole fluid pressure.

Pressure compensation has been accomplished in a laboratory environment by means of a flexible tubing (see a note entitled "An Improved In Situ pH Sensor for Oceanographic and Limnological Applications" by S. Ben-Yaakov and E. Ruth, *Limnology and Oceanography,* Vol. 19, #1, January, 1974, pp. 144-151). Exposed, flexible tubing is however physically untenable for well logging applications. The same note also suggests creation of a positive pressure differential by forcing a KCl electrolyte solution into a rubber bulb. The proposed use is in an unconfined oceanographic environment. Such a device would not be mechanically feasible, however, in a borehole. A further problem therefore involved in pressure compensation or creation of a positive pressure differential as outlined above is to devise means of ruggedizing the entire system so that the electrolyte reservoir and the pressure compensation or differential pressure device are both adequately protected from the external environment.

SUMMARY OF THE INVENTION

It is therefore a general object of the invention to provide an improved logging probe for accurate measurement of redox potential in a mud-filled borehole.

It is a further object of the invention to provide a logging probe of such character with improved means for pressure compensation of the reference electrode.

It is another object of the invention to provide a logging probe of the character described wherein the probe design is such to insure that the electrodes make good contact with the external mud and yet are self-cleaning.

It is a still further object of the invention to provide a logging probe of the character described in which means are provided for minimizing the leak rate of the electrolyte of the reference electrode.

It is yet a further object of the invention to provide a logging probe of the character described wherein a large positive leak pressure is established for the electrolyte.

It is still another object of the invention to provide a logging probe of the character described wherein means are devised for ruggedizing the reference and redox electrodes.

Other objects and advantages of the invention will become apparent from a consideration of the detailed description set forth hereafter taken in conjunction with the accompanying drawings and as more particularly set forth in the appended claims.

In accordance with a preferred embodiment of the invention, a logging probe consists of an elongated probe having a main cylindrical body and a streamlined nose. At least one reference electrode and one measuring electrode extend longitudinally through the probe main body and contact the borehole mud flush with the external surface of the nose.

The electrolyte phase of the reference electrode occupies an internal compartment extending longitudinally within a solid nonconductive portion of the probe body adjacent the nose. Flexible means such as a rubber diaphragm having low permeability to gases and liquids are recessed in the probe side wall so as to form an interface between this compartment and the borehole fluid, thereby equalizing the external hydrostatic pressure. Fluid junction between the electrolyte and the external mud is provided by means of a permeable plug recessed within the surface of the nose. A streamlined cage protects the nose of the probe and is formed of a plurality of thin plastic members oriented to "knife" through the mud. A thermistor extends along the probe axis and projects downwardly from the nose.

In accordance with an alternate embodiment of this invention, the electrolyte compartment is separated from the pressure-compensating diaphragm by an intermediate compartment of heavy fluid situated above the electrolyte compartment and separated therefrom by a second flexible divider. The specific gravity of the heavy fluid is several times greater than that of any borehole fluid likely to be encountered. Thus, a strong positive or outward leak pressure across the exposed surface of the nose plug is insured at all times.

DESCRIPTION OF THE PREFERRED EMBODIMENTS

Figure 1A:
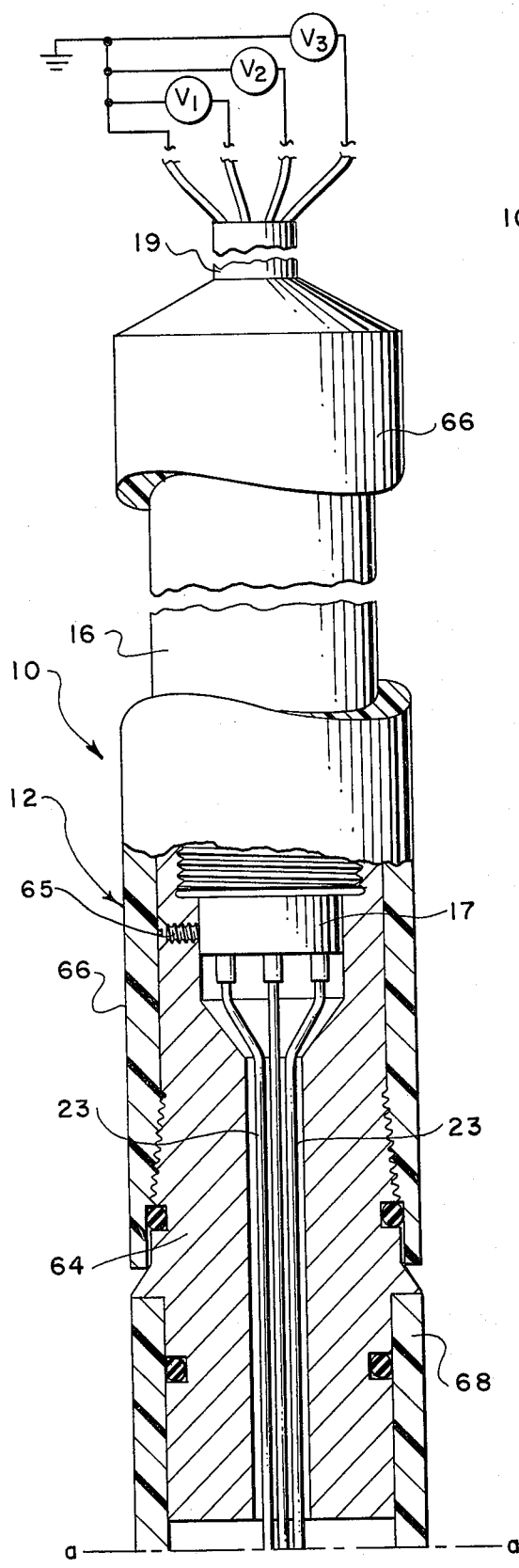
FIG. 1a is an illustration of the upper part of a logging probe in accordance with this invention, partly in vertical section taken along line 1—1 in FIG. 5 and partly in elevation with parts broken away and longitudinally compressed.
Figure 1B:
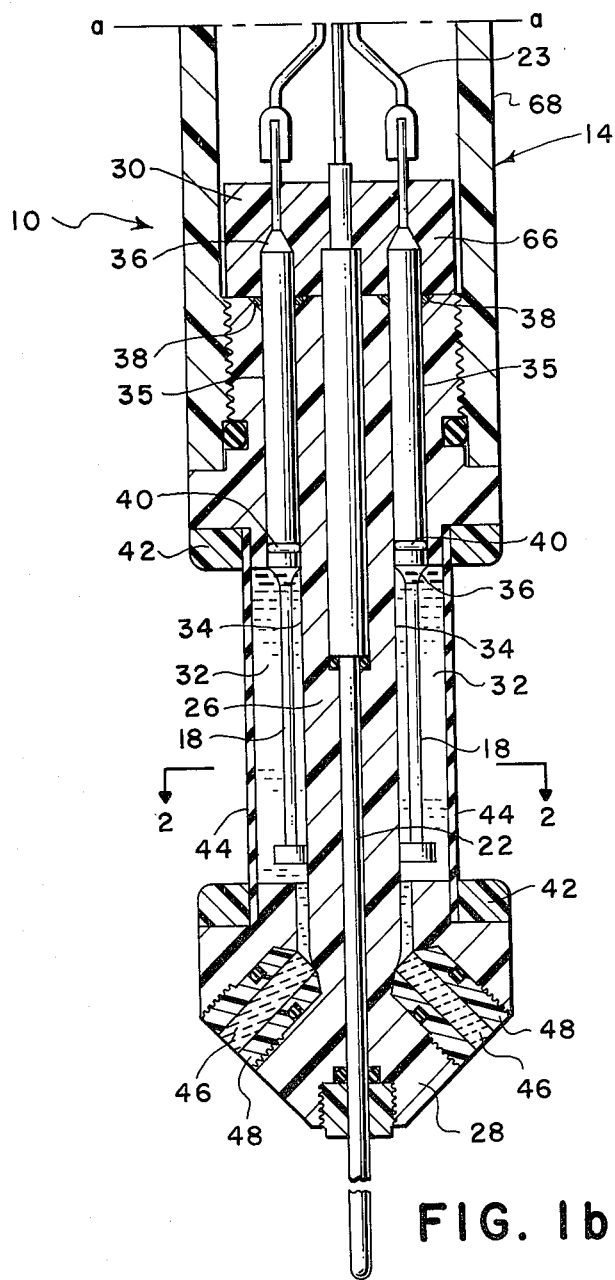
FIG. 1b is a continuation of the view of FIG. 1a illustrating a vertical section taken along line 1—1 in FIG. 5 through the lower part of a logging probe in accordance with this invention.
Figure 2:
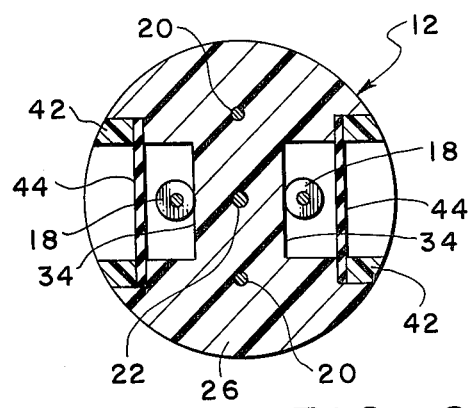
FIG. 2 is a cross-sectional view taken along the line 2—2 in FIG. 1b.
Figure 3:
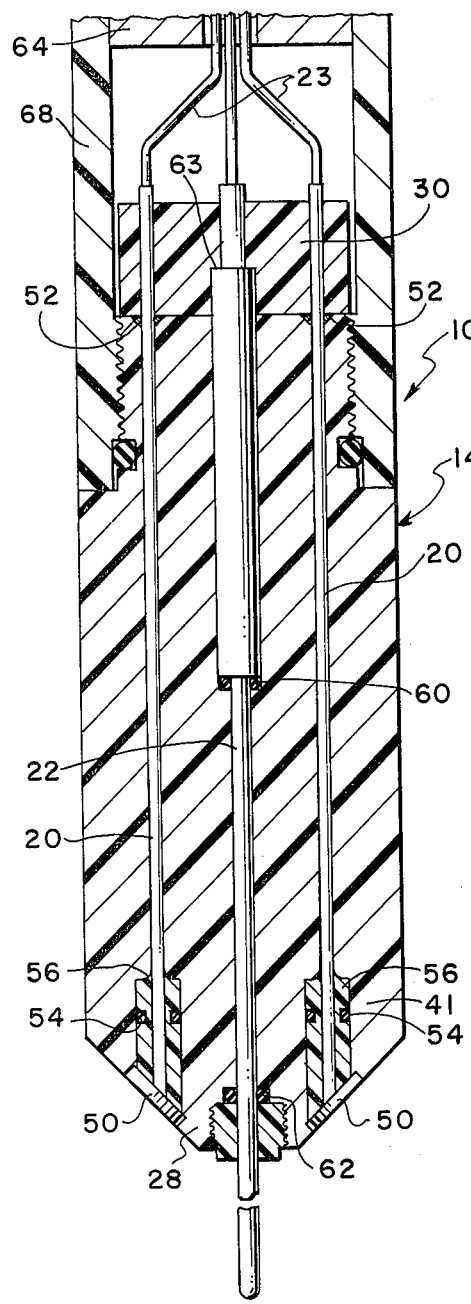
FIG. 3 is a vertical section through the lower part of a logging probe in accordance with this invention taken along the line 3—3 in FIG. 5.

With reference now to FIGS. 1a, 1b and 3, there is shown a logging probe 10 in accordance with this invention adapted for measurement in a mud-filled borehole of redox potential and other formation characteristics. For convenience in representation, the probe 10 has been divided along broken line a-a into an upper probe part 12 (FIG. 1a) and a lower probe part 14 (FIG. 1b). The upper part 12 houses an electronics cartridge 16, whose internal details do not form a part of this invention and which contains suitable power sources and amplifiers (not shown). The cartridge 16 receives signal inputs from below through a multi-pin connector 17 and provides corresponding amplified signal outputs to the surface through cable 19. The lower probe part 14 contains a pair of reference electrodes, each consisting of a metal electrode 18 immersed in an electrolyte 32; a pair of measuring electrodes 20; and a thermistor 22, all of which are adapted to contact the mud of a borehole when the probe 10 is lowered therein. Leads 23 extending upward from electrodes 18 and 20 and from thermistor 22 within probe 10 are interconnected with cartridge 16 through the connector 17. By means well known in the art, the differential voltage developed between each reference electrode 18 and a respective one of measuring electrodes 20 is amplified within the cartridge 16 and connected at the surface to respective volt meters $V_1$ and $V_2$, shown diagrammatically in FIG. 1a. In like manner, a voltage output from thermistor 22 proportional to varying resistance is connected to a surface volt meter $V_3$, all of these voltages being conveniently measured with respect to a common ground established within the body of the probe 10.

As best seen in FIG. 1b, lower probe part 14 includes a solid nonconductive body portion 26 of polycarbonate or other suitable plastic. The body portion 26 narrows at its lower end to form a streamlined, cone-shaped nose 28. At the opposite or upper end of the body portion 26, there is secured a cylindrical, plastic block 30 whose function will be apparent from what follows.

The pair of metal reference electrodes 18, preferably of silver-silver chloride construction, are partially encased within a like pair of plastic sleeves 35 occupying longitudinal bores in opposite quadrants of the body portion 26. The encased length of electrodes 18 is cemented in place by filling sleeves 35 with an epoxy coating 36, which is shown in FIG. 1b at the upper and lower ends of said sleeves 35. The purpose of the sleeves 35 is to provide a firm bearing surface for upper and lower pressure seals 38 and 40.

The lower exposed ends of electrodes 18 are immersed in the fluid electrolyte 32, preferably potassium chloride, which fills respective internal compartments 34 hollowed out of the body portion 26. Recessed protectively below the surrounding side wall of the probe 10 and secured to body portion 26 by means of rectangular plastic retaining frames 42, a pair of flexible diaphragms 44 are positioned so as to form an interface between respective compartments 34 and the external borehole fluid.

The diaphragms 44 should be impermeable to gas and liquid and are preferably formed of a material such as butyl rubber. The lower ends of the compartments 34 extend downwardly through the body portion 26 so that they are in contact respectively with the upper ends of slanting permeable ceramic plugs 46 secured within plastic casings 48 which are recessed within the body portion 26. The lower ends of the plugs 46 lie flush with the cone-shaped surface of the nose 28 to establish a fluid bridge with the borehole mud.

With particular reference to FIG. 3, the measuring electrodes 20 are seen extending longitudinally of the lower probe part 14, also encased within the body portion 26 and disposed parallel to the reference electrodes 18 but in separate opposed quadrants of the probe 10. The electrodes 20 enlarge at their extremities to form disks 50 also lying flush with the slanting surface of the nose 28. Pressure seals 52 and 54 are positioned adjacent the upper and lower ends respectively of the electrodes 20, the lower seals 54 being seated against the surface of enlarged plastic bushings 56. For measurement of redox potential, electrodes 20 are selected to be inert metal such as platinum.

In order to accurately measure borehole temperature simultaneously while sensing redox potential with the device of this invention, the thermistor 22 is conveniently positioned along the central probe axis so that it protrudes any suitable distance below the nose 28. Uppwer and lower pressure seals 60 and 62 insure that no pressure leakage will occur along the interface between the probe 22 and the body portion 26.

Beause of the very high borehole pressures which may be encountered in usage which may be on the order of 1000 psi, it is important to insure that such pressure cannot force the electrodes 18 and 20 or the thermistor 22 upwardly within the probe 10. When the block 30 is secured against the upper surface of the body portion 26 by suitable fastening means (not shown), it exerts counterpressure downwardly against the shoulders of the electrode sleeves 35 encased therein and against the enlarged diameter portion 63 of the thermistor 22 similarly situated. In like manner the enlarged bushings 56 will bear against the body portion 26 to resist any inward pressure against the disks 50.

With particular reference to FIG. 1a, there is seen an elongated, cylindrical steel block 64 having its lower end spaced above the compression block 30 and its upper end secured to the connector 17. The purpose of the block 64 is to add necessary weight and thus maneuverability to the probe 10, and it also serves to anchor the connector 17 against rotation by means of set screw 65. The leads 23 pass conveniently through a central bore in the block 64, their lower ends being situated within a void in the probe 10 at atmospheric pressure and their upper ends being secured to the connector 17. In order to conveniently assemble the above-described components, internally threaded plastic jackets 66 and 68 are engaged as shown.

In operation the probe 10 is lowered in a mud-filled borehole and moved downwardly at any reasonable logging speed. Movement of the electrolyte 32 through the permeable plugs 46 by a combination of hydrostatic pressure, ionic transfer and capillary action establishes a fluid bridge with the mud of the borehole and hence a free floating reference potential. With the aid of diaphragms 44, the external hydrostatic pressure in the borehole is continuously transmitted to the electrolyte 32. If, therefore, the specific gravity of the electrolyte 26 is approximately equal to that of the external mud, the pressure differential existing at the exposed surface of the nose plugs 46 is substantially zero or very slightly positive. This is a desirable situation in that substantially no electrolyte is lost through usage. In the event that the specific gravity of the external mud exceeds that of the electrolyte 26, a small, negative leak pressure results at the external surface of plugs 46. This pressure is limited to the difference in pressure head between the external mud and the electrolyte 26 over the small vertical distance between the lower end of the diaphragms 44 and the exposed surface of the plugs 46. However, even if such small negative leak pressure does occur, capillary action within the plugs 46 will normally overcome it.

Inevitably, a certain amount of electrolyte 26 will tend to become depleted in usage. However, because they are substantially coextensive with the vertical height of the compartments 34, the diaphragms 44 will in that event flex inwardly to prevent external mud from seeping in to contaminate the electrolyte 26.

Figure 4:
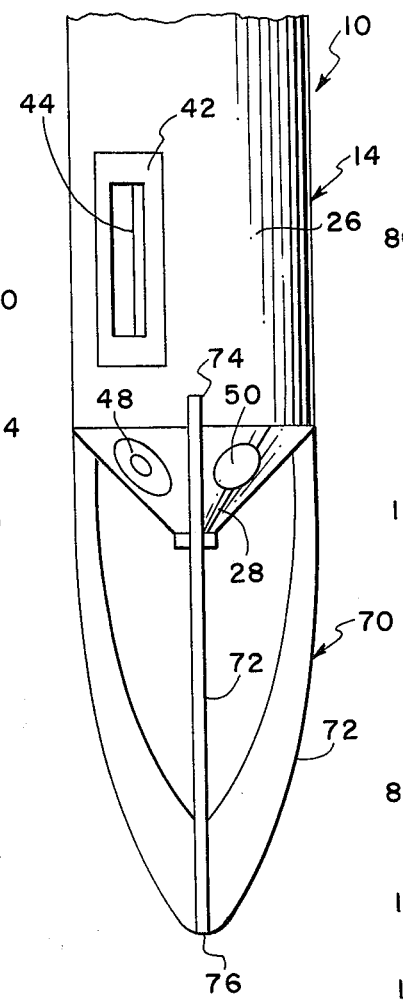
FIG. 4 is an elevation of the lower part of a logging probe in accordance with this invention, illustrating a protective cage extending from the nose.
Figure 5:
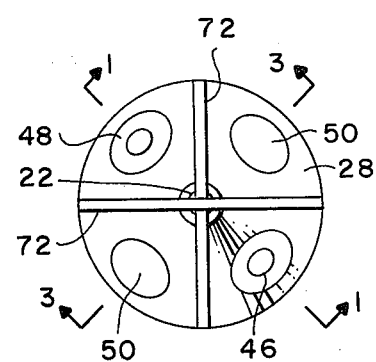
FIG. 5 is a elevational view of the nose of a logging probe in accordance with this invention.

At reduced scale, FIG. 4 illustrates the lower part 14 of the probe 10 including a streamlined cage structure 70 projecting downwardly from the nose 28. The cage 70 may be composed of a plurality of symmetrically arranged, thin-edged ribs 72. The upper ends of the ribs 72 are slotted into the cylindrical surface of the lower portion 14 while their lower ends are mated along a common axis 76. The purpose of the cage 70 is to provide mechanical protection for the main body of the probe 10 while at the same time insuring minimum resistance to the passage of the device through a borehole at any desired logging speed. As will be apparent from FIG. 5, the individual ribs of 72 are disposed with respect to the exposed portions of electrodes 18 and 22 so as not to interfere with the smooth streamlined flow of mud across such electrodes. Thus, there is insured a good constant contact with the borehole mud with a self-cleaning action and consequent absence of clogging.

Figure 6:
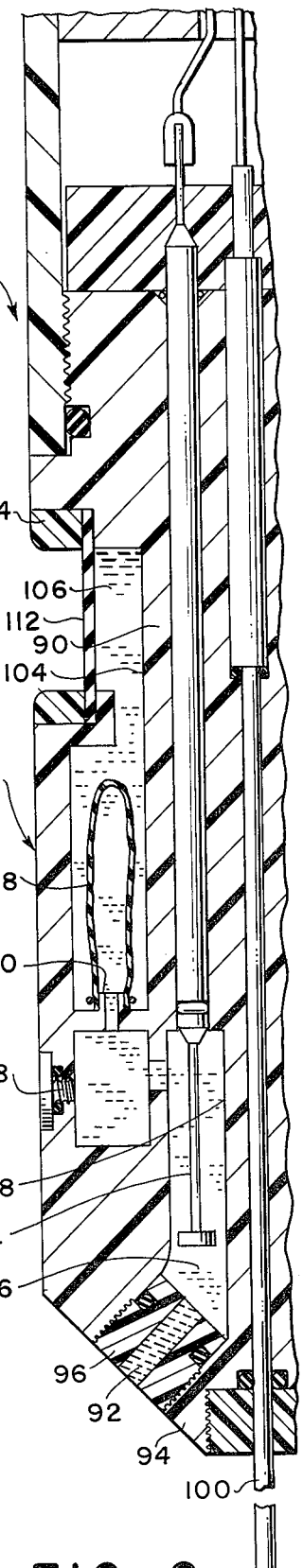
FIG. 6 is a vertical section through the lower part of a logging probe similar to FIG. 1b in accordance with an alternate embodiment of this invention, with parts cut away.

If under severe high pressure borehole conditions resulting from use of a heavy borehole mud, it is desirable to insure a more substantial positive leak pressure for the reference electrodes 18 as previously described, the alternate embodiment of this invention of FIG. 6 may be employed. In a logging probe 80, a partial view of the lower probe part 82 is depicted illustrating the placement of a longitudinally-extending reference electrode 84. In a manner similar to that described above, the lower end of the electrode 84 is immersed in a body of electrolyte 86 confined within an internal compartment 88 hollowed out of plastic body portion 90. The lower end of compartment 88 communicates with a permeable plastic plug 92 whose lower end lies flush with the external surface of the nose 94 suitably retained within plastic casing 96. Additional electrolyte 86 may be added within compartment 88 through a sidewall filler plug 98.

The lower probe part 82 also includes an axially extending thermistor 100 which functions in the manner described previously. It will be understood that the complete probe 80 includes a quadrant (not shown) opposite to that of FIG. 6 housing a mirror imaged counterpart of the reference electrode 84 together with the associated operative features to be described. It should further be understood that probe 80 preferably includes a pair of measuring electrodes (not shown) similar to those described in connection with FIG. 3 but situated respectively in the remaining two opposing quadrants.

Situated above the compartment 88 within the body portion 90 is a second upper compartment 104 which is filled with a quantity of heavy fluid 106, for example, Miriam 3. The specific gravity of fluid 106 should be at least several times greater than that of any borehole fluid expected in use. The interface between electrolyte 86 and fluid 106 is established by means of a thin, finger like diaphragm 108 which has its open, lower edge conveniently clamped to a ring 110 projecting upwardly from the lower end of the compartment 104. The upper end of the compartment 104 is separated from the external environment by means of a rectangular, flexible diaphragm 112, similar in construction and operation to that of diaphragms 44, which is secured in a recessed position in the side wall of probe 80 by rectangular plastic retainer ring 114.

If the external borehole mud and the electrolyte 86 have approximately the same density, a net positive leak pressure will be established at the nose of probe 80, measured by the pressure head which heavy fluid 106 generates. Even if the weight of the mud considerably exceeds that of the electrolyte 86, the fluid pressure head generated in combination by the electrolyte 86 and fluid 106 over the distance measured between the bottom of the diaphragm 112 and the external surface of the plug 92 may easily exceed the corresponding external pressure head. Thus, even under severe conditions a positive leak pressure is assured.

The measuring electrodes 20 may be readily employed to determine other formation characteristics in addition to redox potential which are valuable in mapping geochemical cells. This is accomplished by forming electrodes 20 of a particular solid ion selective material. For example, a substantial indication of hydrogen ion (pH) or sulfide ion concentration may be obtained by employing antimony or silver respectively.

It is apparent that in the above discussion of probe 10 that the two pairs of electrodes 18 and 20 are employed for redundancy. Therefore, if desirable one electrode 18 and one reference electrode 20 could just as easily be used to obtain single, differential voltage measurement. A similar simplification is likewise possible with probe 80.

Although the invention has been described and illustrated with a certain degree of particularity, it is understood that the present disclosure is made by way of example only and that numerous changes in the details of construction and the combination and arrangement of parts may be resorted to without departing from the spirit and scope of the invention as hereinafter claimed.

We claim:

1. A probe for electric logging of subsurface formations by sensing the electric potential arising in a mud-filled borehole comprising:
   (a) an elongated, cylindrical probe body terminating at its forward end in a streamlined nose;
   (b) a potential measuring electrode;
   (c) a chemical reference electrode formed of a metal electrode member immersed within a fluid electrolyte, said electrodes extending longitudinally of said cylindrical probe body in electrical isolation, the respective lower ends of said electrodes being situated flush with the external surface of said nose and adapted thereby to make electrical contact with the external mud in said borehole;
   (d) means within said probe body for containing said electrolyte;
   (e) flexible means forming an interface between said containing means and the fluid of said borehole, said flexible means being thereby adapted to transmit the external hydrostatic pressure of said borehole fluid to said electrolyte and being deformable to reduce the effective volume of said containing means responsive to loss of said electrolyte; and
   (f) permeable means adapted to establish a fluid bridge between said electrolyte and said borehole fluid.

2. Apparatus as in claim 1 wherein said containing means is a compartment within said probe body and wherein said flexible means is a diaphragm common to said compartment and the external surface of said probe body.

3. Apparatus as in claim 2 wherein said diaphragm is recessed below the surrounding external surface of said probe body.

4. Apparatus as in claim 3 wherein said diaphragm constitutes a wall of said compartment in contact with the borehole fluid.

5. In a probe for electrical logging of subsurface formations by measuring electrical potential arising in a fluid-filled borehole including a reference electrode and a measuring electrode electrically isolated from each other and disposed within the body of said probe so as to contact the fluid in said borehole, the improvement comprising:
   (a) a reference electrode member;
   (b) a fluid electrolyte within which at least a portion of said electrode member is immersed to form said reference electrode;
   (c) means within said probe body for containing said electrolyte;
   (d) flexible means forming an interface between said containing means and the borehole fluid and adpated thereby to transmit the external hydrostatic pressure of said borehole fluid to said electrolyte; and
   (e) permeable means adapted to establish a fluid bridge between said electrolyte and said borehole fluid.

6. In an elongated probe for electrical logging of subsurface formations by measuring electrical potentials arising in a fluid-filled borehole, including a measuring electrode and a reference electrode electrically isolated from each other and disposed within said probe so as to contact the fluid in said borehole, the improvement comprising:
   (a) an electrode member immersed in a first body of fluid constituting an electrolyte so as to form said reference electrode;
   (b) permeable means for establishing a fluid bridge between said first body of fluid and the borehole fluid;
   (c) a second body of fluid within said probe body, said second body of fluid being confined so that with vertical probe orientation it lies substantially above said first body of fluid so as to exert downward pressure thereon;
   (d) a pressure transmitting barrier separating said first and second fluid bodies; and
   (e) flexible means adapted to transmit the external hydrostatic pressure in said borehole fluid to said second body of fluid.

7. Apparatus as in claim 6 wherein said second body of fluid has a specific gravity at least several times greater than that of the borehole fluid.

* * * * *